US009539947B1

(12) United States Patent
Jensen et al.

(10) Patent No.: US 9,539,947 B1
(45) Date of Patent: Jan. 10, 2017

(54) RUNNING BOARD BRACKET

(71) Applicant: Ford Global Technologies, LLC, Dearborn, MI (US)

(72) Inventors: John W. Jensen, Canton, MI (US); David James Bauch, South Lyon, MI (US); John Vincent Fazio, Dearborn, MI (US); Mahmoud Yousef Ghannam, Canton, MI (US); Howard Churchwell, Monroe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/943,205

(22) Filed: Nov. 17, 2015

(51) Int. Cl.
*B60R 3/02* (2006.01)
*B60R 3/00* (2006.01)
*B60D 99/00* (2009.01)

(52) U.S. Cl.
CPC ............... *B60R 3/002* (2013.01); *B60D 7/00* (2013.01); *B60R 3/02* (2013.01)

(58) Field of Classification Search
CPC ............. B60R 3/02; B60R 3/002; B60D 7/00
See application file for complete search history.

(56) References Cited

U.S. PATENT DOCUMENTS

| 1,026,102 | A | | 5/1912 | Mather |
| 1,826,979 | A | | 10/1931 | Banschbach |
| 5,895,064 | A | * | 4/1999 | Laubach ............. B60R 3/002 248/205.1 |
| 7,311,320 | B2 | * | 12/2007 | Kuntze ............... B60R 3/002 280/163 |
| 7,874,565 | B2 | | 1/2011 | Duncan |
| 8,528,925 | B2 | | 9/2013 | McFarlane |
| 2003/0006575 | A1 | | 1/2003 | Genis et al. |
| 2007/0228748 | A1 | | 10/2007 | Ryan et al. |

FOREIGN PATENT DOCUMENTS

EP          1115594 B1       11/2002

* cited by examiner

*Primary Examiner* — John Walters
*Assistant Examiner* — James Triggs
(74) *Attorney, Agent, or Firm* — Jason C. Rogers; Brooks Kushman P.C.

(57) ABSTRACT

A running board assembly for a vehicle including a running board and a plurality of brackets for connecting the running board to a rocker. The brackets include first and second planar supports extending downward and laterally outward from the rocker to the running board. The planar supports are spaced from each other and are disposed in a vertical/transverse plane. The first and second planar supports are disposed parallel to each other and form a parallelogram connecting the running board to the rocker that deflects in a longitudinal direction when impacted from the side in an impact. The running board assembly includes a mounting plate attached to the rocker that defines a plurality of longitudinally extending slots. The first and second planar supports are secured to the mounting plate with a first set of fasteners that are received in the slots.

17 Claims, 2 Drawing Sheets

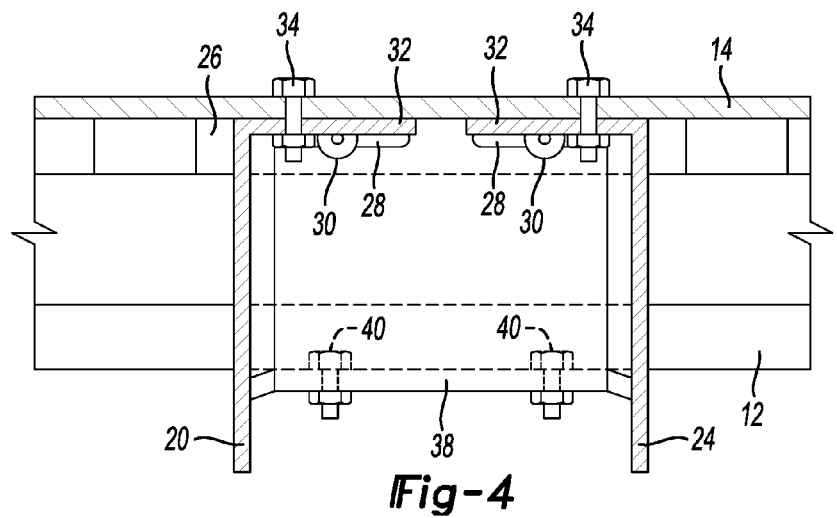
Fig-4
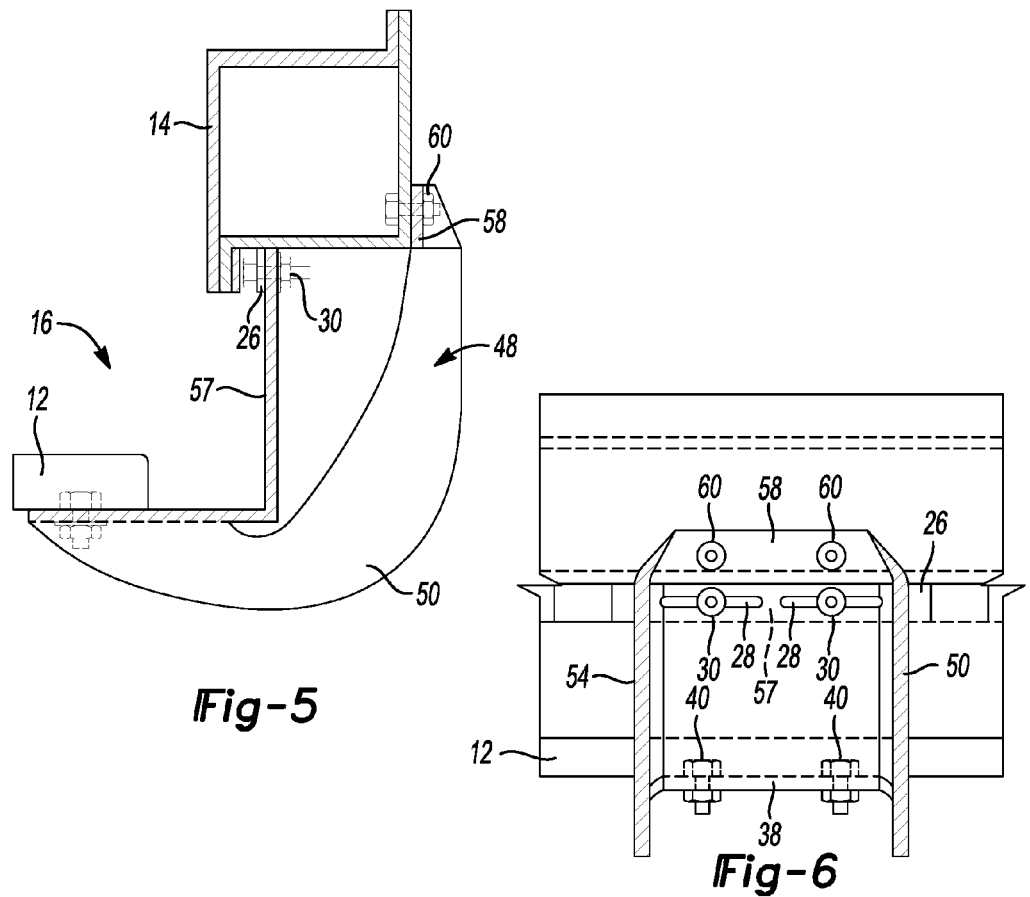
Fig-5
Fig-6

RUNNING BOARD BRACKET

TECHNICAL FIELD

This disclosure relates to a bracket for attaching a running board to the rocker assembly of a vehicle.

BACKGROUND

Running boards are popular accessories for vehicles such as trucks or sport utility vehicles that have high ground clearance. Passengers may step on the running board to facilitate entering or exiting the passenger compartment of high ground clearance vehicles. Running boards must be attached to a vehicle with brackets that are capable of supporting the weight of a heavy person (e.g. 300 pounds) without substantial deflection.

Many different types of running boards may be offered on similar vehicles such as flat plate running boards, rounded running boards, tubular running boards, step bar running boards, or the like. Running boards may be fabricated from fiberglass, steel or aluminum.

Running boards offered as optional accessories may change the response of a vehicle to side impact tests and also may affect calibration of airbag sensors. Airbag sensors may include pressure sensors or accelerometers that sense g-forces. Sensor recalibration may be required if different running boards react differently to lateral loading in a side impact. If one running board design absorbs more energy than a different running board design, each design must be separately tested and the airbag sensors must be recalibrated to accommodate the selected running board.

This disclosure is directed to solving the above problems and other problems as summarized below.

SUMMARY

According to one aspect of this disclosure, a running board assembly is disclosed for a vehicle that includes a running board and a plurality of brackets for connecting the running board to a rocker. The plurality of brackets include first and second planar supports extending downward and laterally outward from the rocker to the running board, the planar supports are spaced from each other and are primarily disposed in a vertical/transverse plane.

According to other aspects of this disclosure, the first and second planar supports are disposed parallel to each other and form a parallelogram connecting the running board to the rocker to facilitate deflection in a longitudinal direction when impacted from the side in a collision.

The running board assembly may further comprise a mounting plate attached to the rocker. The mounting plate may define a plurality of longitudinally extending slots that the first and second planar supports are secured to with a first set of fasteners. The first and second planar supports may include an inner flange secured to the rocker by a second set of fasteners. The first set of fasteners is secured to the slots between the inner flange and the running board. The planar supports are secured to the running board by a third set of fasteners.

The planar supports are secured to the slot by the first set of fasteners at a design location. However, the location where the planar supports are secured to the slot may shift in response to an impact with the running board. The planar supports are designed to buckle in response to twisting and bending moments applied to the planar supports from the side in a collision. The planar supports may yield to facilitate moving the running board under the rocker in an impact.

According to another aspect of this disclosure, a bracket is disclosed for attaching a running board to a rocker of a vehicle. The bracket comprises a first support arm, a second support arm, and a mounting plate that is attached to the rocker. The first and second arms are each disposed in a vertical/transverse plane and are secured to the mounting plate and the running board with fasteners.

The first and second support arms are disposed parallel to each other and form a parallelogram connecting the running board to facilitate deflecting the rocker in the longitudinal direction in an impact.

The mounting plate may define a plurality of longitudinally extending slots and the first and second support arms may be secured to the longitudinally extending slots with a first set of fasteners. The first and second support arms include an inner flange that may be secured to the rocker by a second set of fasteners. The first set of fasteners are secured to the slots between the inner flange and the running board. The support arms may be secured to the running board by a third set of fasteners.

The support arms are secured to the slot by the first set of fasteners at a design location. The location where the support arms are secured to the slot may shift in response to an impact with the running board. The support arms are adapted to buckle in response to twisting and bending moments applied to the support arms in a collision with the side of the vehicle and yield to facilitate moving the running board under the rocker in an impact.

According to a further aspect of this disclosure, a vehicle is disclosed that, in part, comprises a rocker, a running board, and a bracket attaching the running board to the rocker. The bracket rigidly supports the running board in response to vertically applied loads to the running board. However, the bracket is more flexible in response to horizontally applied loads to the running board.

The bracket may further comprise a mounting plate secured to the rocker. The mounting plate defines a plurality of longitudinally extending slots. The bracket is adapted to slide along the slots in response to a twisting and bending loads applied to the running board in a collision. The bracket is secured to the rocker between the running board and a location where an inner flange is secured to an inboard location on the rocker. The inner flange is attached to either a downwardly facing surface of the rocker or an inwardly facing surface of the rocker.

The above aspects of this disclosure and other aspects are described below with reference to the attached drawings.

BRIEF DESCRIPTION OF THE DRAWINGS

FIG. 4 is a cross-sectional view taken along the line 4-4 in FIG. 2.

FIG. 5 is a cross-sectional view similar to FIG. 2 of an alternative embodiment of a running board assembly.

FIG. 6 is a cross-sectional view similar to FIG. 4 of the embodiment of FIG. 5.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
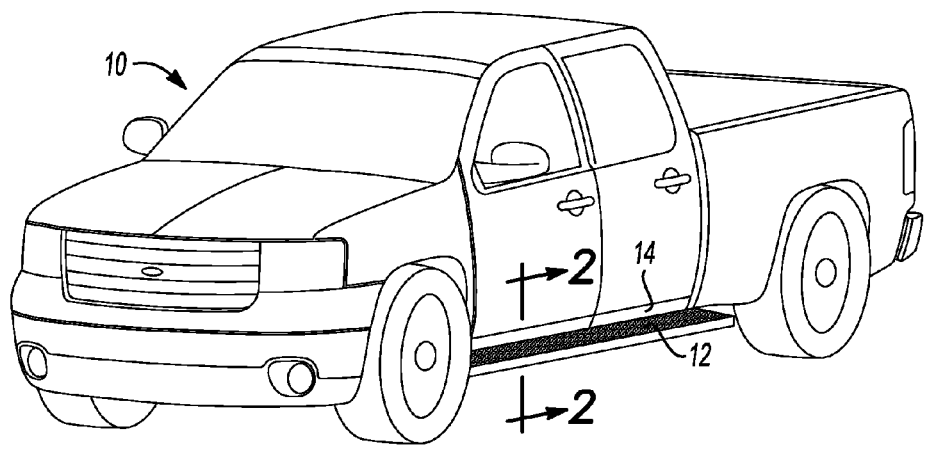
FIG. 1 is a front side perspective view of a pick-up truck equipped with a running board.

Referring to FIG. 1, a vehicle 10 is shown that includes a running board 12 attached to a rocker 14. As used herein, directional references to the longitudinal direction refer to the fore-and-aft vehicle direction. References to the lateral direction refer to the transverse, or cross-car, vehicle direction. References to inboard location or an inner side refer to articles that are located nearer or face the longitudinal centerline of the vehicle.

Figure 2:
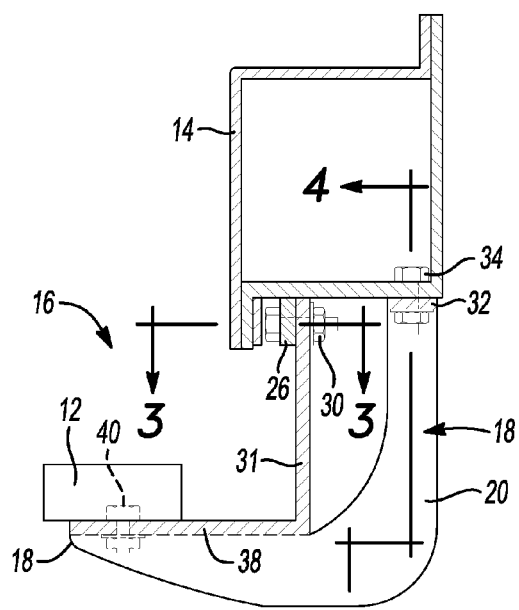
FIG. 2 is a cross-sectional view taken along the line 2-2 in FIG. 1.

Referring to FIG. 2, the running board 12 is shown to be attached to the rocker 14 by a running board bracket assembly generally indicated by reference numeral 16. The running board bracket assembly 16 includes a pair of brackets generally indicated by reference numeral 18 with one bracket being shown in FIG. 2. The bracket 18 includes a first planar support arm 20.

Figure 3:
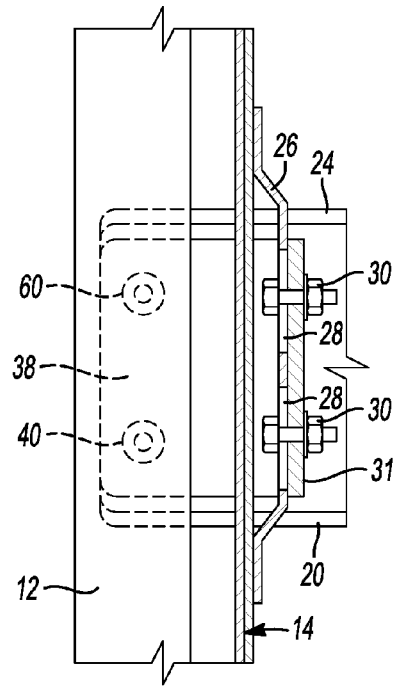
FIG. 3 is a cross-sectional view taken along the line 3-3 in FIG. 2.

Referring to FIGS. 2 and 3, a second planar support arm 24 is illustrated that is not visible in FIG. 2. The first and second planar support arms 20 and 24 are secured to a mounting plate 26. The mounting plate 26 is secured to the rocker 14. The mounting plate 26 defines a pair of longitudinally extending slots 28 that are adapted to receive a first set of fasteners 30. The first set of fasteners 30 are slidable within the longitudinally extending slots 28. The mounting plate 26 is secured to the rocker 14 and to an intermediate flange 31 of each of the planar support arms 20, 24.

Referring to FIGS. 2 and 4, the first and second planar support arms 20 and 24 are attached to the rocker 14 by the second set of fasteners 34. The second set of fasteners 34 secure the inner flange 32 of each of the first and second planar support arms 20 and 24 to the rocker 14. The first and second planar support arms 20 and 24 also include a running board attachment flange 38. The running board attachment flange 38 is secured to the running board 12 by a plurality or running board fasteners 40, or a third set of fasteners.

In a partially sideways collision with the running board 12, the first and second planar support arms 20 and 24 are adapted to be displaced longitudinally in response to applying a relatively small load. The first and second planar support arms 20 and 24 fold in a matchbox fashion as the fasteners 30 slide within the longitudinally extending slots 28.

The planar supports 20 and 24 are spaced from each other and are disposed in a substantially vertical/transverse plane. The first and second planar supports 20 and 24 form a parallelogram connecting the running board 12 to the rocker 14. The running board 12 is adapted to deflect in a longitudinal direction when impacted by a lateral force in a collision.

The planar supports 20 and 24 are secured to the slots 28 by the fasteners 30 at a design location, as shown in FIGS. 3 and 4, that is generally centered within the slots 28. The location of the planar supports 20 and 24 may be shifted in response to an impact with the running board 12. The planar supports 20 and 24 are designed to buckle in response to twisting and bending movements applied to the planar supports 20 and 24. The planar supports 20 and 24 are adapted to yield to facilitate moving the running board 12 under the rocker 14 in a collision.

Referring to FIGS. 5 and 6, an alternative embodiment is illustrated of a bracket assembly generally indicated by reference numeral 48. The bracket 48 include a first planar support arm 50 and a second planar support arm 54. The support arms are secured to the running board 12 and rocker 14. The support arms 50 and 54 are part of a running board bracket assembly 16. The planar support arms 50 and 54 each have an intermediate flange 57 that is secured by the mounting plate 26 to the rocker 14 by a first set of fasteners 30. The first set of fasteners 30 secures the planar support arms 50 or 54 to the mounting plate 26 through the longitudinally extending slots 28.

A second set of fasteners 60 secures the inner flange 58 of the support arms 50 and 54 to the rocker 14. The embodiment shown in FIGS. 5 and 6 is secured to an inner surface of the rocker 14, while the embodiment of FIGS. 2-4 is attached to a downwardly facing, or lower surface, of the rocker 14.

In both the embodiments of FIGS. 2-4 and 5 and 6, the inner flange 32, 58 is fixedly connected to the rocker 14 while the intermediate flanges 31, 57 are secured to the planar support arms 20, 24, 50, 54 at an intermediate location between the inboard fasteners 34, 60 and the running board 12. The fasteners 30 are slidably received within the slots 28 and secure the planar support arms to the rocker 14 with a controlled level of torque to facilitate matchboxing the brackets 18 and 48 in a collision that impacts the running board 12. The bracket assemblies 18, 48 rigidly support the running board 12 in response to vertically applied loads, such as when a person steps on the running board, but is more flexible in response to horizontally applied loads to the running board that include a longitudinal force component.

The brackets 18, 48 are also twisting and bending loads being applied to the running board 12 in a collision. The mounting plates 26 secure the brackets 18, 48 to the rocker 14 between the running board 12 and the rocker 14.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A running board assembly for a vehicle comprising:
   a running board; and
   a plurality of brackets connecting the running board to a rocker of the vehicle, the brackets including a first and second planar supports extending downward and laterally outward from the rocker to the running board, wherein the planar supports are attached to at least two longitudinally extending slots placed substantially in line with one another and are configured to deform such that the running board is displaced in a longitudinal direction in response to a partial side impact.

2. The running board assembly of claim 1 wherein the first and second planar supports are disposed parallel to each other connecting the running board to the rocker and form a parallelogram, wherein the parallelogram is configured to collapse such that the running board assembly deflects in a longitudinal direction when impacted by a lateral force in an impact.

3. The running board assembly of claim 1 further comprising:

a mounting plate attached to the rocker, the mounting plate defining a plurality of longitudinally extending slots, wherein the first and second planar supports are secured to the mounting plate with a first set of fasteners, and wherein the first and second planar supports include an inner flange secured to the rocker by a second set of fasteners, and wherein the first set of fasteners are received in the slots between the inner flange and the running board and spaced apart from the rocker.

4. The running board assembly of claim 3 wherein the first and second planar supports are secured to the running board by a third set of fasteners.

5. The running board assembly of claim 3 wherein the planar supports include an intermediate flange and are secured to the mounting plate and the intermediate flange by the first set of fasteners, and wherein the fasteners are shiftable relative to the slots in response to an impact with the running board.

6. The running board assembly of claim 5 wherein the fastener includes an outer end and an inner end, wherein the outer end is positioned between the rocker and the mounting plate such that a lateral force applied to the rocker is transferred to the mounting plate.

7. A bracket attaching a running board to a rocker of a vehicle, the bracket comprising:
first and second support arms extending in a vertical/transverse plane;
a mounting plate attached to the rocker defining a plurality of longitudinally extending slots substantially in line with one another; and
a plurality of fasteners connecting the first and second support arms to the mounting plate wherein the slots and fasteners cooperate to allow longitudinal displacement of the running board.

8. The bracket of claim 7 wherein the first and second support arms are disposed parallel to each other and form a parallelogram, wherein the parallelogram is configured to collapse such that the running board assembly deflects in a longitudinal direction when impacted by a lateral force in an impact.

9. The bracket of claim 7 wherein the mounting plate defines a plurality of longitudinally extending slots, wherein first and second support arms are secured to the mounting plate with a first set of fasteners, and wherein the first and second support arms include an inner flange secured to the rocker by a second set of fasteners, and wherein the first set of fasteners are received in the slots between the inner flange and the running board wherein the slots and fasteners cooperate to allow longitudinal displacement of the running board.

10. The bracket of claim 9 wherein the first and second support arms are secured to the running board by a third set of fasteners.

11. The bracket of claim 7 wherein the first and second support arms are include an intermediate flange and are secured to the mounting plate and the intermediate flange secured to the mounting plate by a first set of fasteners at a within the pair of slots, generally at a centered location of the slots wherein the support arms are secured to the slots to shift in response to an impact with the running board.

12. The bracket of claim 7 wherein the first and second support arms are adapted to buckle in response to twisting and bending moments applied to the first and second support arms, wherein the fastener includes an outer end and an inner end, wherein the outer end is positioned between the rocker and the mounting plate, wherein the outer end of the fastener is configured to counteract rotational movement of the support arms in response to a lateral force to the running board.

13. A vehicle comprising:
a rocker;
a running board; and
at least two L-shaped brackets oriented towards each other and attaching the running board to the rocker, the brackets rigidly supporting the running board in response to vertically applied loads to the running board, the bracket being more flexible and moves in response to longitudinally applied loads as compared to the vertically applied loads to the running board.

14. The vehicle of claim 13 further comprising:
a mounting plate defining a plurality of longitudinally extending slots, the mounting plate being secured to the rocker, wherein at least one of the brackets slides relative to the longitudinally extending slots to dissipate twisting and bending loads in response to a lateral force applied to the running board in a collision.

15. The vehicle of claim 14 wherein the mounting plate secures the bracket to the rocker between the running board and a location where an inner flange is secured to an inboard location on the rocker.

16. The vehicle of claim 15 wherein the inner flange is attached to a downwardly facing surface of the rocker.

17. The vehicle of claim 15 wherein the inner flange is attached to an inwardly facing surface of the rocker.

* * * * *